United States Patent
Norton et al.

(10) Patent No.: US 9,256,115 B1
(45) Date of Patent: Feb. 9, 2016

(54) DUAL SIDED LENS ARRAY USING CLEAR BEADS

(71) Applicant: Google Inc., Mountain View, CA (US)

(72) Inventors: Adam E. Norton, Palo Alto, CA (US); Andrei S. Kazmierski, Pleasanton, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/584,301

(22) Filed: Dec. 29, 2014

(51) Int. Cl.
| G03B 21/625 | (2014.01) |
| B32B 37/24 | (2006.01) |
| B32B 37/12 | (2006.01) |
| G02B 5/02 | (2006.01) |

(52) U.S. Cl.
CPC .......... *G03B 21/625* (2013.01); *B32B 37/1284* (2013.01); *B32B 37/24* (2013.01); *G02B 5/0242* (2013.01); *B32B 2037/243* (2013.01); *G02B 5/0278* (2013.01)

(58) Field of Classification Search
CPC .... G03B 21/62; G03B 21/625; G02B 5/0242; G02B 5/0278
USPC .................................................. 359/460, 453
See application file for complete search history.

(56) References Cited

U.S. PATENT DOCUMENTS

| 5,563,738 | A | 10/1996 | Vance |
| 5,724,182 | A | 3/1998 | Mitani et al. |
| 6,204,971 | B1 * | 3/2001 | Morris et al. ................. 359/619 |
| 6,261,402 | B1 * | 7/2001 | Watanabe et al. ............. 156/230 |
| 6,327,091 | B1 * | 12/2001 | Agano ........................... 359/619 |
| 6,449,089 | B1 | 9/2002 | Moshrefzadeh et al. |
| 6,466,368 | B1 * | 10/2002 | Piepel et al. ................... 359/456 |
| 6,469,830 | B1 | 10/2002 | Dubin et al. |
| 6,535,333 | B1 | 3/2003 | Piepel et al. |
| 6,754,005 | B2 | 6/2004 | Goto et al. |
| 6,829,086 | B1 | 12/2004 | Gibilini |
| 6,912,089 | B2 * | 6/2005 | Nakagawa et al. ........... 359/599 |
| 7,233,439 | B2 | 6/2007 | Shimizu |
| 7,443,583 | B2 | 10/2008 | Yamauchi |
| 7,453,635 | B2 | 11/2008 | Yeo et al. |
| 8,233,217 | B2 | 7/2012 | Kindler et al. |
| 8,369,012 | B2 | 2/2013 | Hannington |
| 2001/0040263 | A1 | 11/2001 | Nakai |
| 2002/0109916 | A1 | 8/2002 | Moshrefzadeh |
| 2003/0184993 | A1 | 10/2003 | Yamada |
| 2005/0007000 | A1 | 1/2005 | Chou et al. |
| 2005/0136365 | A1 * | 6/2005 | Nojima ......................... 430/562 |
| 2006/0061861 | A1 | 3/2006 | Munro et al. |

(Continued)

OTHER PUBLICATIONS

Duparre', J. et al., "Novel Optics/Micro-Optics for Miniature Imaging Systems", Fraunhofer Institute for Applied Optics and Precision Engineering, SUSS MicroOptics SA (2006) 15 pages.

(Continued)

*Primary Examiner* — Christopher Mahoney
(74) *Attorney, Agent, or Firm* — Blakely Sokoloff Taylor & Zafman LLP (57) ABSTRACT

A projection screen includes a transparent substrate having a first side and a second side, a first optically clear adhesive ("OCA") layer disposed across the first side of the transparent substrate, a first two-dimensional ("2D") matrix of clear beads partially embedded into the first OCA layer, and a dark layer disposed across the first OCA layer filling in exposed gaps between the clear beads to block and absorb light incident upon the exposed gaps between the clear beads. The clear beads form optical paths through the dark layer.

14 Claims, 5 Drawing Sheets

(56) References Cited

U.S. PATENT DOCUMENTS

| | | | |
|---|---|---|---|
| 2006/0066803 A1 | 3/2006 | Aylward et al. | |
| 2006/0198020 A1* | 9/2006 | Hannington | 359/453 |
| 2006/0209403 A1 | 9/2006 | Parusel et al. | |
| 2006/0268404 A1 | 11/2006 | Hyobu | |
| 2007/0115548 A1 | 5/2007 | Ebina et al. | |
| 2012/0224150 A1 | 9/2012 | Liu et al. | |
| 2014/0132909 A1 | 5/2014 | Wardhana et al. | |
| 2014/0169029 A1 | 6/2014 | Wardhana et al. | |

OTHER PUBLICATIONS

Wolfe, C.R. et al., "Characterization of *BlackScreen*™ for Rear-Projection Television", Proc. of SPIE vol. 5002 (2003) Downloaded From: http://spiedigitallibrary.org/ on Nov. 19, 2013, pp. 97-105.

Morris, G.M. et al., "Engineered diffusers™ for display and illumination systems: Design, fabrication, and applications", www.RPCphotonics.com, downloaded from Internet prior to Jun. 12, 2014, 11 pages.

Sales, Tasso R.M. et al., "Light Tamers Engineered microlens arrays provide new control for display and lighting applications", Photonics Spectra, Reprinted from the Jun. 2004 issue of Photonics Spectra, 4 pages.

"Vikuiti™, Vikuiti™ Rear Projection Film", Vikuiti Display Enhancement 3M, Data sheet Oct. 2006, 3M Optical Systems Division, 6 pages.

Vikuiti™, "Vikuiti™ Rear Projection Display Screen", Vikuiti Projection Display Components 3M, 3M Optical Systems Division, downloaded from Internet prior to Jun. 12, 2014, 8 pages.

Dnp, "Cross Prism Screen™", Dnp visual experience, www.dnp-sereenscom, Apr. 2012, 3 pages.

Kazmierski, A. et al., "High Contrast Rear Projection Screen for Use With a Diverging Illumination Source", U.S. Appl. No. 14/303,190, filed Jun. 12, 2014, whole document.

Norton, A.E. et al., "High Contrast Rear Projection Screen", U.S. Appl. No. 14/303,163, filed Jun. 12, 2014, whole document.

* cited by examiner

DUAL SIDED LENS ARRAY USING CLEAR BEADS

TECHNICAL FIELD

This disclosure relates generally to display technologies, and in particular, to rear projection screens.

BACKGROUND INFORMATION

Conventional rear projection screens use a thin diffusing layer in the form of a matte screen. An image is projected onto the back of the diffusing layer, where it is diffused and re-projected into the viewing environment. The diffusing layer provides an image surface and its diffusive nature serves to increase the viewing angles from which the image can be observed. Often these simple diffusing layer projection screens have poor contrast in well-lit rooms. This poor contrast is due, at least in part, from the scattering of ambient light back into the viewing environment, thereby deleteriously affecting the black levels and contrast of the rear projection screen.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of an apparatus, system and method of fabrication for a high contrast rear projection screen having a wide viewing angle are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
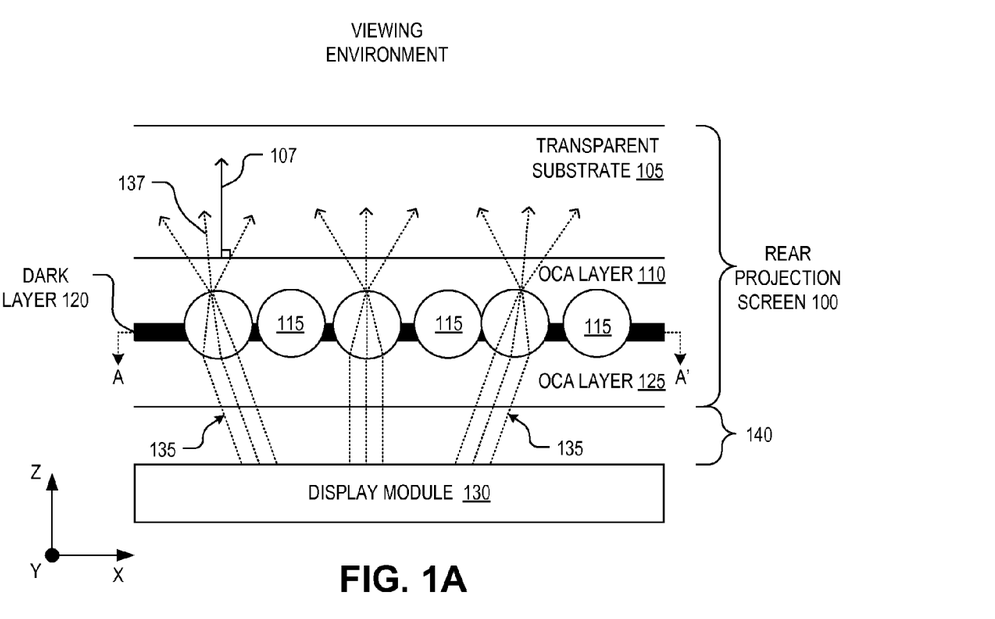
FIG. 1A is a cross-sectional illustration of a rear projection screen, in accordance with an embodiment of the disclosure.
Figure 1B:
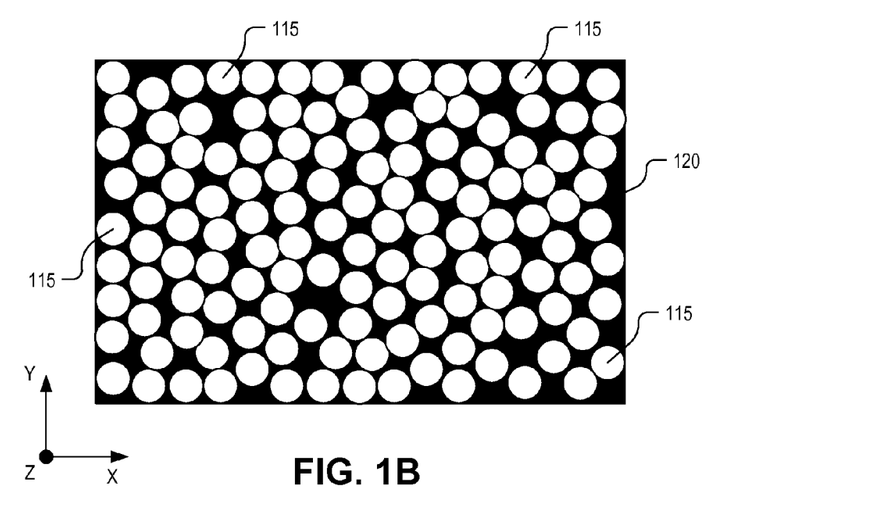
FIG. 1B is a plan view illustration of clear beads embedded in a dark layer of a rear projection screen, in accordance with an embodiment of the disclosure.

FIGS. 1A and 1B illustrate different aspects of a rear projection screen 100, in accordance with an embodiment of the disclosure. FIG. 1A is a cross-sectional view illustrating the multiple laminated layers of rear projection screen 100, while FIG. 1B is a cross-sectional view along line A-A' in FIG. 1A through dark layer 120. The illustrated embodiment of rear projection screen 100 includes a transparent substrate 105, an optically clear adhesive ("OCA") layer 110, a two-dimensional ("2D") matrix of clear beads 115, a dark layer 120, and an OCA layer 125.

When integrated with a display module 130, display light 135 is projected onto the backside of rear projection screen 100 through an optical layer 140. Rear projection screen 100 re-distributes display light 135 into the viewing environment with a wider viewing angle and increased angular brightness uniformity. In one embodiment, display light 135 is emitted from rear projection screen 100 with a substantially Lambertian distribution, similar to a diffuse radiator.

In one embodiment, optical layer 140 may be a simple clear substrate that provides a physical offset for optical expansion of divergent display light 135. In other embodiments, optical layer 140 may include lensing optics to condition display light 135 prior to reaching rear projection screen 100. Conditioning optics may include optical layers that adjust the vergence or direction of display light 135.

Display module 130 may be implemented using a variety of display technologies. For example, display module 130 may be implemented using direct emission displays (e.g., organic light emitting diode displays, micro light emitting diode displays, etc.) or externally illuminated displays (e.g., liquid crystal displays, liquid crystal on silicon displays, etc.). Accordingly, display module 130 may include both a display technology and an illumination source.

During operation, display module 130 emits display light 135 onto the backside of rear projection screen 100 through optical layer 140. In the illustrated embodiment, display light 135 is divergent light having chief rays 137 per pixel that are increasingly oblique with offset from the image center (or offsets from multiple sub-image centers as described in FIG. 5). As such, clear beads 115 form optical pathways through dark layer 120 having optical power that both bends chief rays 137 towards the normal 107 of transparent substrate 105 and increases the divergence of display light 135. Clear beads 115 have different refractive indexes than OCA layers 110 and 125, thereby forming a dual sided lens structure at their opposing curved sides. In one embodiment, clear beads 115 have a higher refractive index than OCA layers 110 and 125. For example, clear beads 115 may be fabricated of high index glass or clear polymer (e.g., polyethylene terephthalate, etc.). In some embodiments, clear beads 115 have an index of refraction ranging between 1.6 to 2.4. OCA layers 110 and 125 may be fabricated of a variety of materials including a low refractive index, silicone-based liquid cement (e.g., Loctite 5193), the solid gel material OptAlphaGel sold by Taica North America Corporation, or otherwise. In one embodiment, OCA layer 110 and/or 125 are thin (e.g., 50 um), clear sheets of dual-sided contact adhesive. Alternatively, OCA layer 110 and/or 125 may be a clear adhesive that is thinly applied (e.g., spin coated) and partially cured into a thin tacky layer.

Clear beads 115 serve an additional purpose than just bending chief rays 137 and increasing divergence of display light 135. Clear beads 115 also serve to collect display light 135 and pass it through dark layer 120 to the viewing environment. Dark layer 120 forms an opaque layer that absorbs and blocks light from passing through the gaps between adjacent clear beads 115. Dark layer 120 increases the contrast of rear projection screen 100 by absorbing ambient light incident through transparent substrate 105 from the viewing environment and reducing deleterious back reflections. In various embodiments, dark layer 120 may be fabricated of a dark pigmented powder (e.g., iron oxide powder), a liquid, or a gel pigment.

As illustrated in FIG. 1B, clear beads 115 are randomly disposed in a two-dimensional ("2D") matrix across rear projection screen 100 within the laminated structure between the OCA layer 110 and OCA layer 125. By using a random, single layer distribution of clear beads 115, fabrication of the laminated structure is simplified. In other words, expensive/complicated fabrication techniques to align clear beads 115 with individual pixels of display module 130 are not necessary. Accordingly, fabrication and replication is simplified when compared to projection screens having one-to-one alignment between lenses on the display screen and display pixels.

Although FIG. 1A illustrates a configuration where transparent substrate 105 is disposed on the top or outer most layer of rear projection screen 100, in various other embodiments, the sub-layers of rear projection screen 100 may be flipped such that transparent substrate 105 is an inner layer of rear projection screen 100 adjacent to display module 130. In such embodiments, other optical screen layers may be disposed over the top or outer portion of rear projection screen 100. For example, in one embodiment where transparent substrate 105 is flipped to the inner or bottom layer adjacent to display module 130, a conventional dark screen layer may overlay rear projection screen 100. In these flipped embodiments, clear beads 115 of rear projection screen 100 operate to reduce the viewing angle asymmetry versus lateral position on the screen while the outer conventional dark screen layer operates to increase contrast in ambient light. An example conventional dark screen layer includes the Cross Prism Screen without the Fresnel lens layer manufactured by DNP Denmark AS of Denmark.

Figure 2:
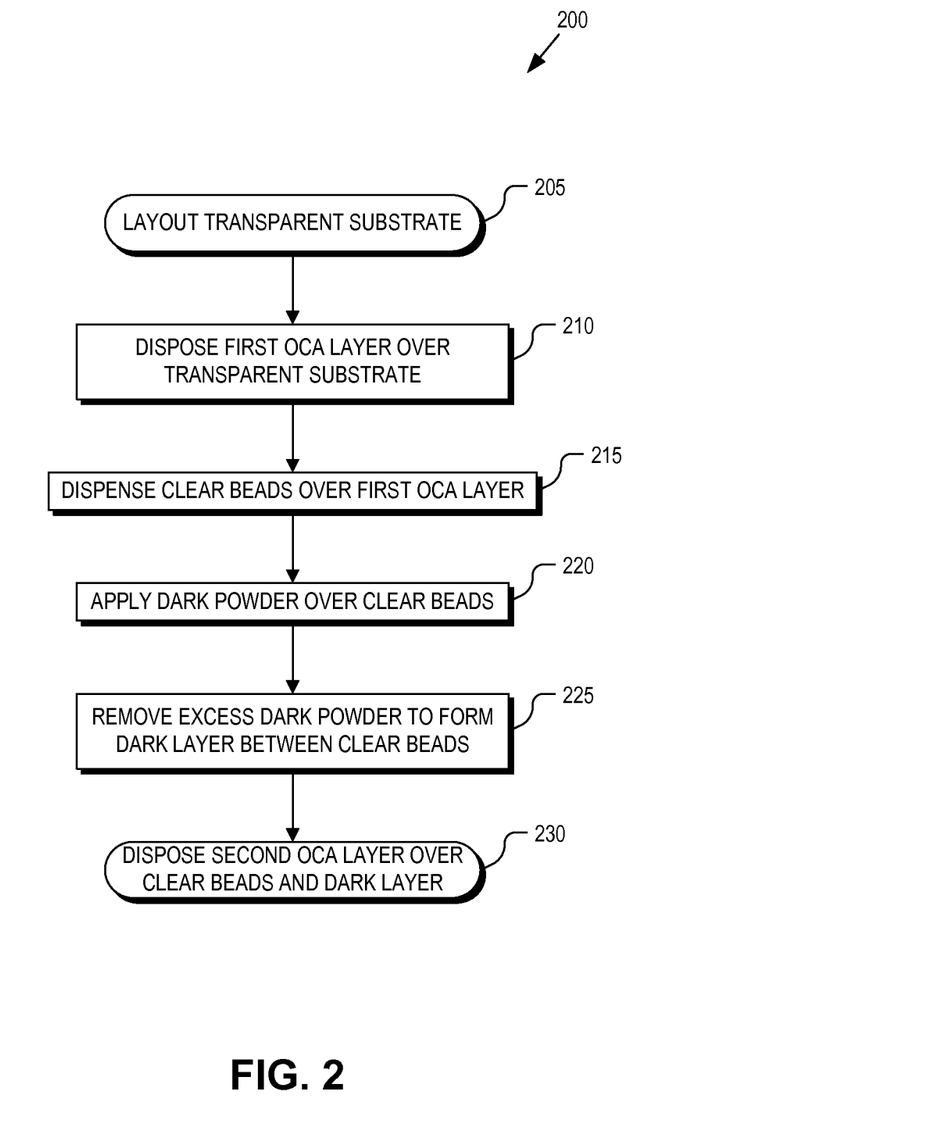
FIG. 2 is a flow chart illustrating a process of fabricating a rear projection screen, in accordance with an embodiment of the disclosure.

FIG. 2 is a flow chart illustrating a process 200 of fabricating rear projection screen 100, in accordance with an embodiment of the disclosure. The order in which some or all of the process blocks appear in process 200 should not be deemed limiting. Rather, one of ordinary skill in the art having the benefit of the present disclosure will understand that some of the process blocks may be executed in a variety of orders not illustrated, or even in parallel.

In a process block 205, transparent substrate 105 is laid out as the initial step in the lamination process. Transparent substrate 105 may be fabricated of glass or plastic that is cut or formed to size.

In a process block 210, the first OCA layer 110 is disposed over the surface of transparent substrate 105. In one embodiment, OCA layer 110 is a dual-sided adhesive layer in the form of a sheet or film that is adhered to transparent substrate 105. In another embodiment, OCA layer 110 is a clear liquid adhesive that is coated (e.g., spin coated, rolled, etc.) onto transparent substrate 105 and cured to a tacky consistency. In one embodiment, OCA layer 110 is approximately 50 um thick, though thinner or thicker layers may be implemented.

In a process block 215, clear beads 115 are disposed over the exposed surface of OCA layer 110. As mentioned, OCA layer 110 is a soft adhesive layer. Accordingly, clear beads 115 are dispensed in such a manner and with appropriate force to cause clear beads 115 to partially embed into and adhere to OCA layer 110. In one embodiment, clear beads 115 embed approximately half their diameter into OCA layer 110. Clear beads 115 may range in size from 10 um to 500 um in diameter. In one embodiment, clear beads 115 are approximately 60 um in diameter. An example dispensing technique may include pouring clear beads 115 over the exposed surface of OCA layer 110 and brushing the excess clear beads 115 off to achieve a single layer or 2D matrix. Other techniques may include blowing the excess clear beads 115 off with a compressed gas, tipping transparent substrate 105 upside down, a combination of these techniques, or otherwise. By pouring clear beads 115 over the exposed surface of OCA layer 110, clear beads 115 form a random matrix that does not require active alignment.

After a single layer of clear beads 115 has been impregnated into OCA layer 110, dark layer 120 is applied over the protruding clear beads 115 and exposed gaps of OCA layer 110 between the 2D matrix of clear beads 115 (process block 220). In the illustrated embodiment, dark layer 120 is a dark or pigmented powder (e.g., iron oxide) that is dusted over the exposed surface. Since OCA layer 110 is an adhesive, the dark powder adheres to the exposed portions of OCA layer 110 thereby filling in the gaps between clear beads 115. Excess dark powder is removed leaving behind dark layer 120 filling in the gaps between adjacent clear beads 115 (process block 225). The excess dark powder may be removed via compressed air, flipping transparent substrate 105 upside down, brushing or squeegeeing the surface of clear beads 115, magnetic removal, or otherwise.

Finally, in a process block 230, the second OCA layer 125 is disposed over clear beads 115 and dark layer 120. Since clear beads 115 extend through and protrude from dark layer 120, the interfacing side of OCA layer 125 conforms to the protruding portions of clear beads 115. Again, OCA layer 125 may be applied as a tacky/adhesive film or a liquid that is subsequently cured.

Figure 3:
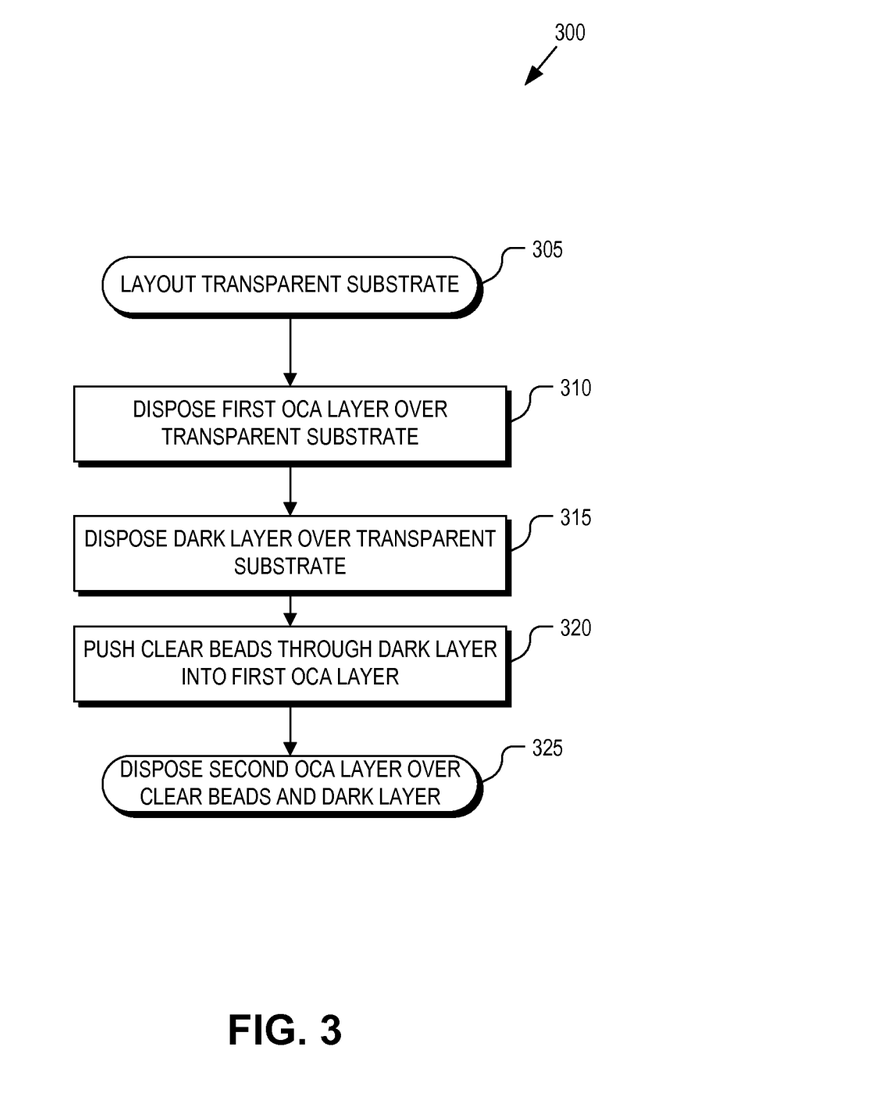
FIG. 3 is a flow chart illustrating another process of fabricating a rear projection screen, in accordance with an embodiment of the disclosure.

FIG. 3 is a flow chart illustrating another process 300 of fabricating rear projection screen 100, in accordance with an embodiment of the disclosure. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

In a process block 305, transparent substrate 105 is laid out as the initial step in the lamination process. Again, transparent substrate 105 may be fabricated of glass or plastic that is cut or formed to size.

In a process block 310, the first OCA layer 110 is disposed over the surface of transparent substrate 105. In one embodiment, OCA layer 110 is a dual-sided adhesive layer in the form of a sheet or film that is adhered to transparent substrate 105. In another embodiment, OCA layer 110 is a clear liquid adhesive that is coated (e.g., spin coated, rolled, etc.) onto transparent substrate 105 and cured to a tacky consistency. In one embodiment, OCA layer 110 is approximately 50 um thick, though thinner or thicker layers may be implemented.

In a process block 315, dark layer 120 is disposed over the exposed OCA layer 110. In one embodiment, dark layer 120 is a soft liquid or gel-like layer. In another embodiment, dark layer 120 may be cured to a soft tacky consistency. In either embodiment, dark layer 120, at least initially, has a consistency that is softer than OCA layer 110, which is still soft enough to be impressed by clear beads 115, but is firmer than dark layer 120.

In a process block 320, clear beads 115 are dispensed over the surface of dark layer 120, pushed through dark layer 120, and partially embedded into OCA layer 110. Since OCA layer 110 has firmer consistency than dark layer 120, it performs a squeegee-like effect on dark layer 120 as clear beads 115 are impressed down into OCA layer 110. This leaves a clear optical path through clear beads 115, while forming an opaque barrier in the gaps between clear beads 115. After embedding clear beads 115, dark layer 120 may be further cured.

Finally, in a process block 325, the second OCA layer 125 is disposed over clear beads 115 and dark layer 120. Since clear beads 115 extend through and protrude from dark layer 120, the interfacing side of OCA layer 125 conforms to the protruding portions of clear beads 115. Again, OCA layer 125 may be applied as a tacky/adhesive film or a liquid that is subsequently cured.

Figure 4:
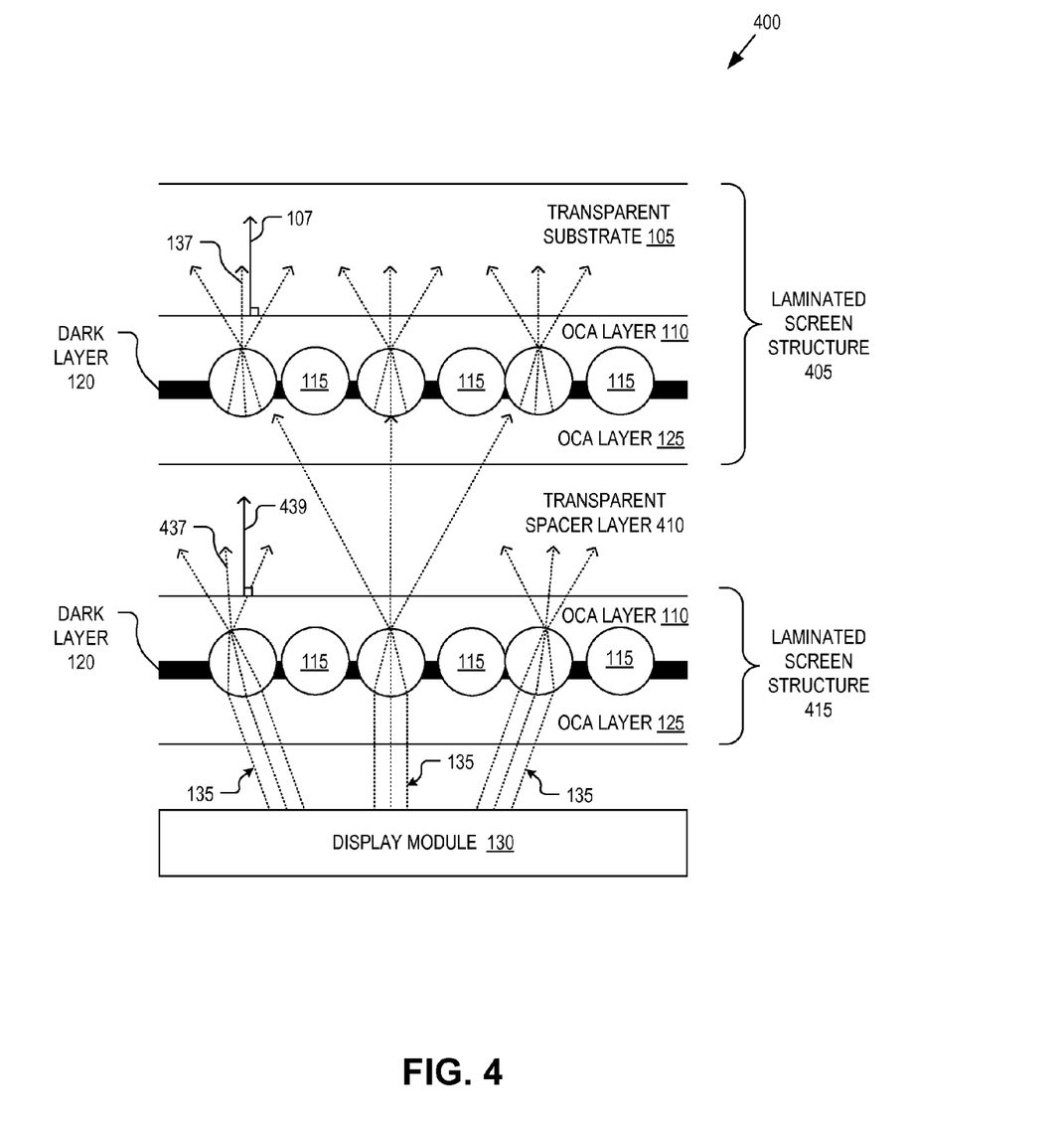
FIG. 4 is a cross-sectional illustration of a rear projection screen including dual layers of clear beads, in accordance with an embodiment of the disclosure.

FIG. 4 is a cross-sectional illustration of a rear projection screen 400 including dual layers of clear beads, in accordance with an embodiment of the disclosure. The illustrated embodiment of rear projection screen 400 includes a laminated screen structure 405, a transparent spacer layer 410, and a laminated screen structure 415. The illustrated embodiment of laminated screen structure 405 includes the same subcomponents as rear projection screen 100. The illustrated embodiment of laminated screen structure 415 includes additional instances of OCA layer 110, clear beads 115, dark layer 120, and OCA layer 125. This dual laminated screen structure serves to increase the normal incidence of chief rays 137 on transparent substrate 105.

As illustrated in FIG. 4, chief rays 437 output from laminated screen structure 415 may still have a small amount of obliqueness relative to normal 439 of transparent spacer layer 410. Accordingly, by introducing two layers of clear beads 115, chief rays 137 are bent closer to normal 107. By improving the normality of chief rays 137 output from rear projection screen 400, improved brightness uniformity is achieved.

During operation, display light 135 passes through the first layer of clear beads 115 within laminated screen structure 415. This first pass bends the oblique chief rays towards normal 439 and increases the divergence of display light 135. As the divergent display light 135 traverses transparent spacer layer 410, each beam output from a given clear bead 115 expands and illuminates several clear beads 115 within laminated screen structure 405. By illuminating multiple clear beads 115 in the second layer of clear beads 115, a scintillation effect is reduced. This reduces sparkling at the output of rear projection display 400. Accordingly, transparent spacer layer 410 serves as an expansion layer to allow display light 135 to expand between the laminated screen structures 415 and 405. In various embodiments, transparent spacer layer 410 ranges between 50 um and 100 um. Of course, in other embodiments, transparent spacer layer may be thinner or thicker.

Figure 5:
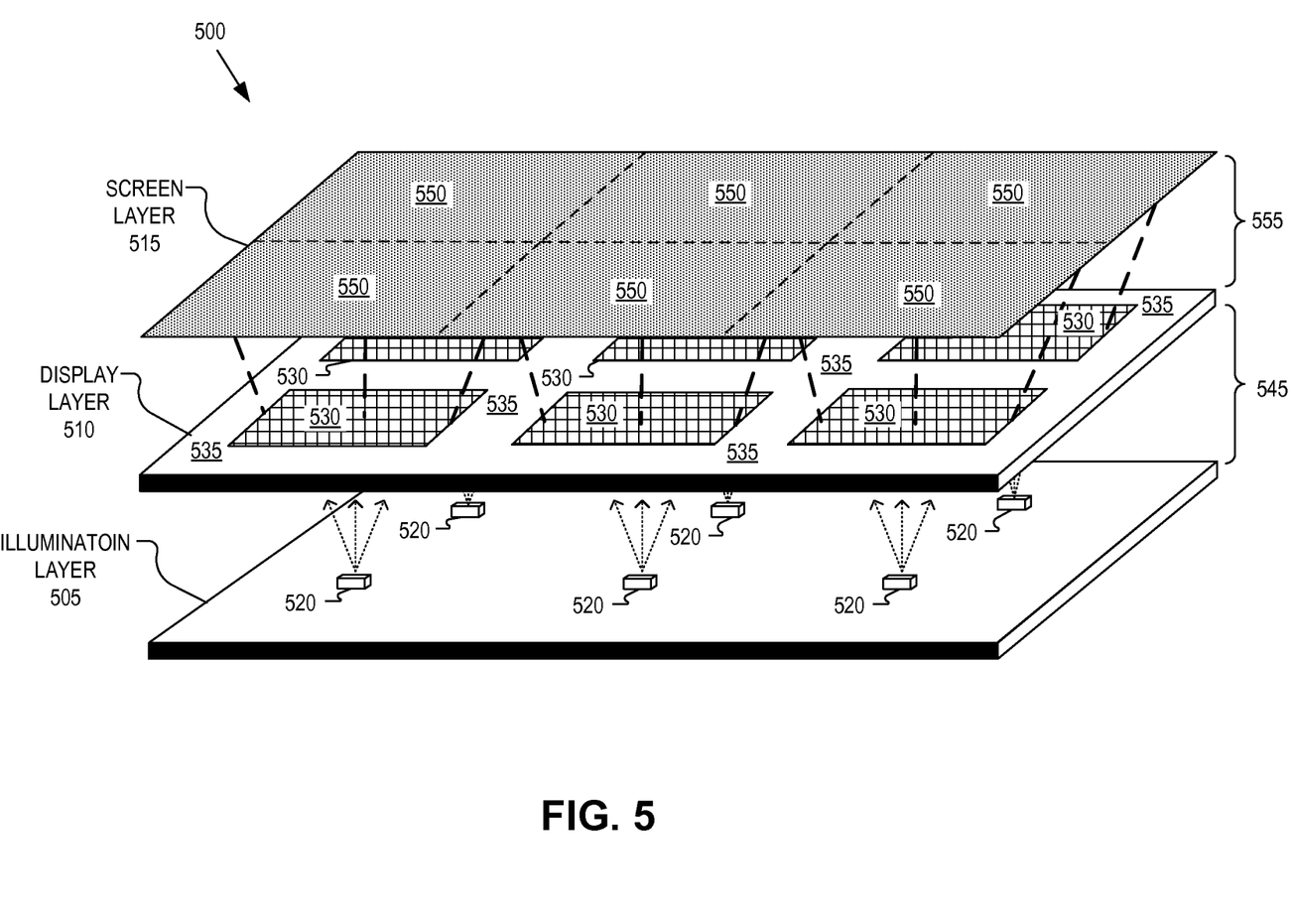
FIG. 5 is a perspective view illustration of functional layers of a rear projection display, in accordance with an embodiment of the disclosure.

FIG. 5 is a perspective view illustration of functional layers of an example rear projection display 500, in accordance with an embodiment of the disclosure. The illustrated embodiment of display 500 includes an illumination layer 505, a display layer 510, and a screen layer 515. Screen layer 515 may be implemented with any of the rear projection screens described above in connection with FIGS. 1-4, or various combinations thereof.

The illustrated embodiment of illumination layer 505 includes an array of illumination sources 520. The illustrated embodiment of display layer 510 includes transmissive pixel arrays 530 separated from each other by spacing regions 535. The illustrated embodiment of screen layer 515 is divided into regions for displaying image portions 550 of an overall unified image. Rear projection display 500 is made up of a plurality of pixlets, each including an illumination source 520, transmissive pixel array 530, and a screen region for displaying an image portion 550 all aligned within a column through display 500. Collectively, illumination layer 505 and display layer 510 represent on possible implementation of display module 130 illustrated in FIGS. 1A and 4. It should be appreciated that the rear projection screens disclosed above may also be used in connection with other rear projection display architectures as well.

In the illustrated embodiment, each illumination source 520 is aligned under a corresponding pixel array 530 to illuminate a backside of the corresponding pixel array with lamp light. Illumination sources 520 may be implemented as independent light sources (e.g., color or monochromatic LEDs, quantum dots, etc.) that emit light with a defined angular spread or cone to fully illuminate their corresponding transmissive pixel array 530 residing above on display layer 510. The illumination layer 505 and display layer 510 are separated from each other by a fixed distance 545 (e.g., 8 mm). This separation may be achieved using a transparent intermediary (e.g., glass or plastic layers) and may further include one or more lensing layers (including lenses, apertures, beam confiners, etc.) to control or manipulate the angular extent and cross-sectional shape of the lamp light emitted from illumination sources 520. In one embodiment, an illumination controller may be coupled to illumination sources 520 to control their illumination intensity. Illumination layer 505 may include a substrate upon which illumination sources 520 are disposed.

Transmissive pixel arrays 530 are disposed on the display layer 510 and each includes an array of transmissive pixels (e.g., 100 pixels by 100 pixels). In one embodiment, the transmissive pixels may be implemented as backlit liquid crystal pixels. Each transmissive pixel array 530 is an independent display array that is separated from adjacent transmissive pixel arrays 530 by spacing regions 535 on display layer 510. The internal spacing regions 535 that separate adjacent pixel arrays 530 from each other may be twice the width as the perimeter spacing regions 535 that separate a given pixel array 530 from an outer edge of display layer 510. In one embodiment, the internal spacing regions 535 have a width of 4 mm while the perimeter spacing regions 535 have a width of 2 mm. Of course, other dimensions may be implemented.

As illustrated, transmissive pixel arrays 530 are spaced across display layer 510 in a matrix with spacing regions 535 separating each transmissive pixel array 530. Spacing region 535 are significantly larger than the inter-pixel separation between pixels of a given transmissive pixel array 530. Spacing regions 535 provide improved flexibility for routing signal lines or the inclusion of additional circuitry, such as a display controller. Spacing regions 535 that reside along the exterior perimeter of display layer 510 also provide space for a bezel trim of display 500. The spacing regions 535 that reside along the exterior perimeter also provide space for power and/or communication ports.

Although FIG. 5 illustrates display layer 510 as including six transmissive pixel arrays 530 arranged into two rows and three columns, it should be appreciated that various implementations of display 500 may include more or less transmissive pixel arrays 530 organized into differing combinations of rows and columns. As such, in embodiments having a one-to-one ratio of illumination sources 520 to transmissive pixel arrays 530, the number and layout of illumination sources 520 on illumination layer 505 may also vary. While FIG. 5 does not illustrate intervening layers between the three illustrated layers for the sake of clarity, it should be appreciated that embodiments may include various intervening optical or structural sub-layers, such as lens arrays, transparent substrates to provide mechanical rigidity and optical offsets, protective layers, or otherwise.

Transmissive pixel arrays 530 are switched under control of a display controller to modulate the lamp light and project image portions 550 onto a backside of screen layer 515. Image portions 550 collectively blend together on screen layer 515 to present a unified image to a viewer from the viewing side of screen layer 515 that is substantially without seams. In other words, the images created by transmissive pixel arrays 530 are magnified as they are projected across separation 555 (e.g., 2 mm) between display layer 510 and screen layer 515. The image portions 550 are magnified enough to extend over and cover spacing regions 535 forming a seamless unified image. The magnification factor is dependent upon separation 555 and the angular spread of the lamp light emitted by illumination sources 520. In one embodiment, image portions 550 are magnified by a factor of approximately 1.5. Not only does the unified image cover the internal spacing regions 535, but also covers the perimeter spacing regions 535. As such, display 500 may be positioned adjacent to other display tiles 500 and communicatively interlinked to form larger composite seamless displays, in which case the unified image generated by a single display tile becomes a sub-portion of a multi-tile unified image.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A projection screen, comprising:
    a transparent substrate having a first side and a second side;
    a first optically clear adhesive ("OCA") layer disposed across the first side of the transparent substrate;
    a first two-dimensional ("2D") matrix of clear beads partially embedded into the first OCA layer; and
    a dark layer disposed across the first OCA layer filling in exposed gaps between the clear beads to block and absorb light incident upon the exposed gaps between the clear beads, wherein a first portion of each of the clear beads is embedded into the first OCA layer and a second portion, opposite the first portion, protrudes through the dark layer, wherein the clear beads form optical paths through the dark layer, wherein the clear beads form optical paths through the dark layer;
    a second OCA layer disposed across the dark layer and the first 2D matrix of clear beads, the second OCA layer conforming around the second portion of each of the clear beads protruding through the dark layer; and
    a laminated screen structure disposed across the second OCA layer opposite the dark layer, the laminated screen structure including a second 2D matrix of clear beads sandwiched between a third OCA layer and a fourth OCA.

2. The projection screen of claim 1, wherein the clear beads have a higher index of refraction than the first and second OCA layers forming dual refractive lenses at curved interfaces between the clear beads and the first and second OCA layers.

3. The projection screen of claim 2, wherein the dual refractive lenses at the curved interfaces bend a chief ray of light incident through the second OCA layer towards a normal of the transparent substrate.

4. The projection screen of claim 1, further comprising:
    a transparent spacer layer disposed between the second OCA layer and the laminated screen structure, wherein the transparent spacer layer is thick enough such that display light directed through a given clear bead of the second 2D matrix of clear beads is expanded to illuminate more than two of the clear beads of the first 2D matrix of clear beads.

5. The projection screen of claim 1, wherein the first 2D matrix of clear beads comprises a random 2D matrix of clear beads.

6. The projection screen of claim 1, wherein the clear beads comprise glass beads.

7. The projection screen of claim 1, wherein the first OCA layer comprises a sheet of clear adhesive plastic.

8. The projection screen of claim 1, wherein the dark layer comprises a dark pigmented powder that adheres to the exposed gaps of the first OCA layer between the clear beads.

9. The projection screen of claim 1, wherein the dark layer comprises a layer of dark pigment that is softer than the first OCA layer.

10. A method of fabricating a laminated projection screen, the method comprising:
    disposing a first optically clear adhesive ("OCA") layer over a transparent substrate;
    disposing a dark pigmented layer over the first OCA layer;
    embedding a two-dimensional ("2D") matrix of clear beads through the dark pigmented layer into the first OCA layer; and
    applying a second OCA layer over the 2D matrix of clear beads and the dark pigmented layer after the 2D matrix of clear beads is embedded through the dark pigmented layer into the first OCA layer,
    wherein the dark pigmented layer is a softer material than the first OCA layer such that the clear beads are pushed through the dark pigmented layer and partially embed into the first OCA layer.

11. The method of claim 10, wherein the first OCA is a firmer material that squeegees the softer material of the dark pigmented layer when the clear beads penetrate through the softer material of the dark pigmented layer to preserve optical paths through the 2D matrix of clear beads.

12. The method of claim 10, wherein the clear beads have a different index of refraction than the first and second OCA layers and wherein optical paths through the 2D matrix of clear beads have optical power to expand exit angles of display light passing through the 2D matrix of clear beads.

13. The method of claim 10, wherein the clear beads of the 2D matrix of clear beads are randomly positioned across the laminated projection screen.

14. A projection screen, comprising:
    a transparent substrate having a first side and a second side;
    a first optically clear adhesive ("OCA") layer disposed across the first side of the transparent substrate;

a first two-dimensional ("2D") matrix of clear beads partially embedded into the first OCA layer; and a dark layer disposed across the first OCA layer filling in exposed gaps between the clear beads to block and absorb light incident upon the exposed gaps between the clear beads, wherein a first portion of each of the clear beads is embedded into the first OCA layer and a second portion, opposite the first portion, protrudes through the dark layer, wherein the clear beads form optical paths through the dark layer;

a second OCA layer disposed across the dark layer and the first 2D matrix of clear beads, the second OCA layer conforming around the second portion of each of the clear beads protruding through the dark layer;

a laminated screen structure disposed across the second OCA layer opposite the dark layer, the laminated screen structure including a second 2D matrix of clear beads sandwiched between a third OCA layer and a fourth OCA; and a transparent spacer layer disposed between the second OCA layer and the laminated screen structure, wherein the transparent spacer layer is thick enough such that display light directed through a given clear bead of the second 2D matrix of clear beads is expanded to illuminate more than two of the clear beads of the first 2D matrix of clear beads.

* * * * *